United States Patent
Nguyen et al.

(10) Patent No.: US 9,667,316 B2
(45) Date of Patent: *May 30, 2017

(54) AIRCRAFT DATA TRANSMISSION USING PHASE SEPARATION

(71) Applicant: The Boeing Company, Chicago, IL (US)

(72) Inventors: Nha Thanh Nguyen, Shoreline, WA (US); Anil Kumar, Sammamish, WA (US); Timothy M. Mitchell, Seattle, WA (US); Radhakrishna G. Sampigethaya, Snoqualmie, WA (US); Arun Ayyagari, Seattle, WA (US); Sudhakar S. Shetty, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 954 days.

This patent is subject to a terminal disclaimer.

(21) Appl. No.: 13/897,243

(22) Filed: May 17, 2013

(65) Prior Publication Data

US 2014/0341309 A1  Nov. 20, 2014

(51) Int. Cl.
*H04B 3/54* (2006.01)

(52) U.S. Cl.
CPC ....... *H04B 3/54* (2013.01); *H04B 2203/5408* (2013.01); *H04B 2203/5466* (2013.01)

(58) Field of Classification Search
USPC ....................................................... 307/1–3
See application file for complete search history.

(56) References Cited

U.S. PATENT DOCUMENTS

| 3,470,787 A | 10/1969 | Mackie |
| 4,886,405 A | 12/1989 | Blomberg |

(Continued)

FOREIGN PATENT DOCUMENTS

| JP | H0369808 A | 3/1991 |
| JP | 2013019512 A | 1/2013 |

OTHER PUBLICATIONS

"European Application No. 14168710.3, Search Report mailed Nov. 10, 2014", 6 pgs.

(Continued)

*Primary Examiner* — Fritz M Fleming
(74) *Attorney, Agent, or Firm* — Kwan & Olynick LLP

(57) ABSTRACT

Provided are methods and systems for terrestrial data transmission between aircrafts and external networks connected to gates at airports. This type of data transmission is performed through an electrical power cable that includes multiple conductors interconnecting electrical components of an aircraft and a gate. Each conductor may be used to establish a separate broadband over power line (BPL) communication channel using its own frequency range that does not overlap with frequency ranges of other channels. As such, no radio frequency (RF) shielding is needed in the cable and any standard multi-conductor cable may be used. A channel management unit is used to control allocation of data domains among different communication channels depending on characteristics of the data domains, characteristics of the channels, and other factors. For example, one channel may be designated for secure data transfer of specific data domains, such as aircraft control data.

19 Claims, 7 Drawing Sheets

(56) References Cited

U.S. PATENT DOCUMENTS

| | | | |
|---|---|---|---|
| 5,918,013 A * | 6/1999 | Mighdoll | G06F 8/65 |
| | | | 348/E5.105 |
| 6,995,658 B2 | 2/2006 | Tustison et al. | |
| 7,893,557 B2 | 2/2011 | Davis et al. | |
| 9,100,104 B2 * | 8/2015 | Nguyen | H04B 3/54 |
| 2005/0143868 A1 | 6/2005 | Whelan | |
| 2008/0217996 A1 * | 9/2008 | Niss | H04B 3/542 |
| | | | 307/9.1 |
| 2012/0099627 A1 | 4/2012 | Mitchell et al. | |
| 2013/0003756 A1 | 1/2013 | Mitchell et al. | |

OTHER PUBLICATIONS

Kumar, et al., "Secure Aircraft Data Transmission Using Multiple Communication Channels", U.S. Appl. No. 14/166,708, filed Oct. 28, 2014, 40 pgs.

Shelton, Jason W. et al., "Multiband Wireless Data Transmission Between Aircraft and Ground Systems", U.S. Appl. No. 14/516,668, filed Oct. 17, 2014, 47 pgs.

Shelton, Jason W., "Multiband Wireless Data Transmission Between Aircraft and Ground Systems Based on Availability of the Ground Systems", U.S. Appl. No. 14/516,659, filed Oct. 17, 2014, 48 pgs.

"Canadian Application Serial No. 2,894,343, Office Action mailed Mar. 8, 2017", 4 pgs.

* cited by examiner

AIRCRAFT DATA TRANSMISSION USING PHASE SEPARATION

BACKGROUND

The amount of software and data stored in and collected by onboard aircraft information systems is growing at a rapid pace. The onboard information systems use software and data for various cabin systems, avionics systems, and entertainment systems, among other things. Data may also be generated by some of these systems during operations of the aircraft. Airlines are typically responsible for updating the data and software on their aircrafts and timely downloading certain data collected during flights. All these activities require fast and secure data transfers between aircrafts and external networks while the aircrafts are on the ground, e.g., parked at the gates. While such data transfers may be performed over a variety of airport and other networks, availability and costs of using these networks may be very limiting.

SUMMARY

Provided are methods and systems for terrestrial data transmission between aircrafts and external networks communicatively coupled to gates at airports. Such data transmission is performed through an electrical power cable also used for providing electrical power to the aircraft. The cable includes multiple conductors interconnecting electrical components of the aircraft and the gate. Each conductor may be used to establish a separate broadband over power line (BPL) communication channel using its own frequency range that does not overlap with frequency ranges of any other channels. As such, no radio frequency (RF) shielding is needed in the cable and any standard multi-conductor power cable may be used for data transmission. A channel management unit is used to control matching different data domains with different communication channels depending on, for example, characteristics of the data domains, characteristics of the channels, and other factors. For example, one channel may be designated for secure data transfer of specific data domains, such as aircraft control data.

In some embodiments, a method for terrestrial data transmission between aircrafts and external networks involves two BPL communication channels through an electrical power cable connected to an aircraft and a gate. The power cable includes two conductors: a first conductor and a second conductor. The first BPL communication channel is established through the first conductor and uses a first frequency band, while the second BPL communication channel is established through the second conductor and uses a second frequency band. The second frequency band does not overlap with the first frequency band. The method also involves generating a first transmission packet and a second transmission packet from multiple data domains using a channel management unit. The channel management unit may generate these transmission packets before, during, or after establishing the BPL communication channels. The method proceeds with sending the first transmission packet for transmission through the first BPL communication channel and the second transmission packet for transmission through the second BPL communication channel.

In some embodiments, transmission of the first transmission packet and the second transmission packet is performed at the same time. More generally, transmission of the first transmission packet is performed independently from transmission of the second transmission packet. The transmission of the packets may be performed based on availability and performance of the BPL communication channels.

In some embodiments, the channel management unit generates the first transmission packet and the second transmission packet based on one or more factors, such as duration of the power cable connection, security status of each of the multiple data domains, security of each of the first BPL communication channel and the second BPL communication channel, transmission priority of each of the multiple data domains, transmission rate of each of the first BPL communication channel and the second BPL communication channel, and data amount in each of the multiple data domains. In some embodiments, the multiple data domains may include aircraft control data, in-flight entertainment, and/or airplane information system.

In some embodiments, the method may involve prefetching at least some of the multiple data domains to the gate. This feature may expedite transmission of the packets from the gate to the aircraft. In some embodiments, the first transmission packet is generated from only one of the multiple domains. For example, the first transmission packet may include only one of the following types of data: aircraft control data, in-flight entertainment, and/or airplane information system. In some embodiments, the first transmission packet is generated from two or more of the multiple domains. For example, the first transmission packet may include a combination of aircraft control data and airplane information system.

In some embodiments, the method also involves generating one or more additional transmission packets for transmitting over the first BPL communication channel. These additional transmission packets may be different from the first transmission packets. The channel management unit may select an order to sending the first and additional transmission packets through the first BPL communication channel.

In some embodiments, the method also involves checking time availability for transmission over the first BPL communication channel and the second BPL communication channel. For example, the channel management unit may be determining the size of each transmission packet and the transmission rate of each channel to determine the time needed to transmit each pack. This time may be compared with the remaining time of the connection between the gate and the aircraft using the electrical power cable.

In some embodiments, at least a portion of the first frequency band is below 30 MHz, while at least a portion of the second frequency band is above 30 MHz. As noted above, the first frequency range does not overlap with the second frequency range. For example, the first frequency range may be between 2 MHz and 28 MHz, while the second frequency range may be between 28 MHz and 60 MHz.

In some embodiments, the method also involves establishing a third BPL communication channel through a third conductor of the electrical power cable. The third BPL communication channel uses a third frequency band that does not overlap with the first frequency band and the second frequency band. The method also involves generating a third transmission packet from multiple data domains using the channel management unit and sending the third transmission packet through the third BPL communication channel. In some embodiments, at least a portion of the first frequency band is below 30 Mhz, while at least a portion of the second frequency band is between 30 Mhz and 67 Mhz, and at least a portion of the third frequency band is above 67 Mhz.

In some embodiments, each of the first conductor and the second conductor is configured to transmit an electrical current of at least about 50 Amps per phase. The electrical power cable may not include a radio frequency (RF) shielding around the first conductor or the second conductor. In some embodiments, the electrical power cable is between about 10 feet and 500 feet long. The method may also involve transmitting electrical power at about 110V and about 400 Hz using the first conductor while sending the first transmission packet through the first BPL communication channel.

Provided also is a system for terrestrial data transmission between aircrafts and external networks. The system includes an electrical power connector for connecting to an electrical power cable. The system also includes the electrical power connector comprising a first conductor and a second conductor. Other components of the system are a first BPL module and a second BPL module. The first BPL module is coupled to the first conductor and configured to establish a first BPL communication channel using a first frequency band. The second BPL module is coupled to the second conductor and configured to establish a second BPL communication channel using a second frequency band. The second frequency band does not overlap with the first frequency band. The system also includes a channel management unit coupled to the first BPL module and to the second BPL module. The channel management unit is configured to generate a first transmission packet and a second transmission packet from multiple data domains. The channel management unit is also configured to send the first transmission packet through the first BPL communication channel and the second transmission packet through the second BPL communication channel.

In some embodiments, the system also includes a first computer system configured to store a first data domain of the multiple data domains and a second computer system configured to store a second data domain of the multiple data domains. The first computer system and the second computer system are communicatively coupled to the channel management system. The multiple data domains may include one or more data types, such as aircraft control data, in-flight entertainment, and airplane information system. In some embodiments, data domains are identified by standardized initiatives, such as Federal Aviation Administration (FAA) NextGen Initiative in the United States and/or Single European Sky ATM Research (SESAR) in Europe.

Provided also is a computer program product including a computer usable medium having a computer readable program code embodied therein. The computer readable program code adapted to be executed to implement a method for terrestrial data transmission between aircrafts and external networks as described in this document.

These and other embodiments are described further below with reference to the figures.

DETAILED DESCRIPTION

Figure 1:
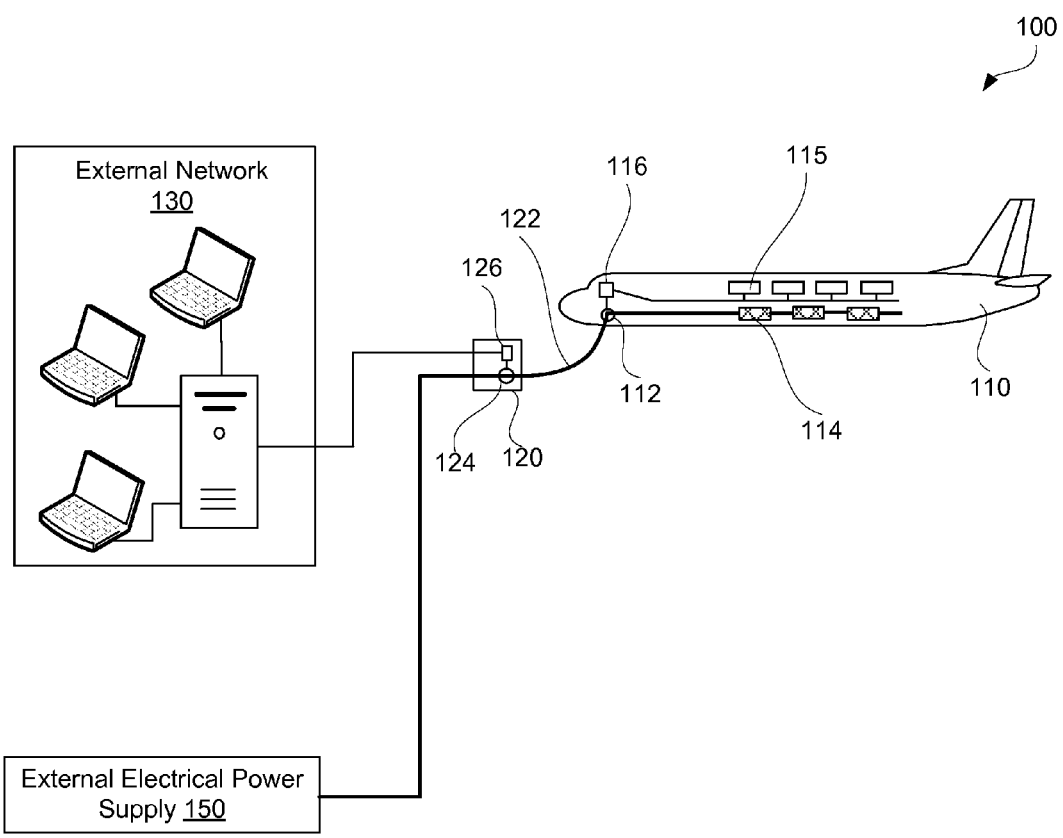
FIG. 1 is a schematic representation of a system for terrestrial data transmission between an aircraft and an external network using an electrical power cable connecting the aircraft to the gate, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Data transfer between aircrafts and external networks, such as airport networks, airline networks, and other types of terrestrial networks, is essential in modern aviation for efficient, secure and safe operations of aircraft. Data collected during prior flights may be transmitted from an aircraft to an airline operating this aircraft for processing, while new data may be uploaded for use during future flights. Often the ground time of an aircraft is limited in order to maximize aircraft's utility, while significant amounts of data need to be transferred to and from the aircraft in an efficient, secure, and robust manner. Wi-Fi and cellular technologies have been proposed for these purposes to replace traditional paper based systems and manual transfer of data carriers. Some of these technologies have been partially adopted by various airports and airlines. However, these technologies are often inconsistent or even unavailable due to technical, business, and regulatory complexities of the airline industry. For example, different designs of existing and new aircrafts make it difficult to integrate antennas for wireless communications or to provide new connectors and communication interfaces. Furthermore, wireless frequency bandwidths available for commercial uses differ in different countries and require specialized equipment. As a result, these technologies have seen very limited growth and are insufficient to support growing demands for data transfer. Many airports and airlines still rely on paper systems and manual exchange of data carriers, such as tapes or disks.

At the same time, other areas of the airline industry have gone through a successful standardization. One such area is electrical power supply to aircrafts at gates in airports. A standard electrical power cable, often referred to as a stinger cable, is used for many types of commercial aircrafts, such as Boeing 707 through Boeing 787 and Airbus 300 through A380. This electrical power cable may be used to supply electrical power using an alternating current (AC) at 110V and 400 Hz. The cable may have three conductors to support three phases of the electrical current, a ground conductor, and a number of control conductors. However, other types of cables used in the airline industry for making connections to aircrafts are also within the scope.

It has been found that these electrical power cables can simultaneously be also used as a medium for wired data transmission between aircrafts and gates using BPL technology. Furthermore, multiple different conductors of a cable may be used for establishing multiple different communication channels and independently transmitting different types of data using these channels. For purposes of this document, different types of data exchanged between aircrafts and external networks may be referred to as data domains. Data domains may differ based on their security status, update schedule, transmission priority, and other like factors. Some examples of data domains include aircraft control data, in-flight entertainment, and airplane information system. In some embodiments, an electrical power cable may include six different conductors, such as three conductors for three phase power transmission, a neutral/ground conductor, and two control conductors. In this example, as many as six separate BPL communication channels may be established between the aircraft and the gate providing various options for data transfer. However, not all conductors need to be used for data transmission. For example, three phase conductors may be used for establishing three different BPL communication channels. One of the channels may be designated for high security data only; another channel, for medium security data that needs to be transferred fast; and yet another channel, for all other channels. A channel management unit may be used to control allocation of BPL communication channels, for example, by generating transmission packs for each specific channel. The transmission packs may be generated by the channel management unit from data domains available for transfer.

In some embodiments, one or more communication channels may be dedicated to a particular data domain or a set of multiple data domains having common characteristics. For example, all high security data may be transmitted through the same channel. This channel may not be used for transmission of any other types of data, for example, regardless its availability. In some embodiments, a communication channel is shared by multiple different domains. Matching of data domains and communication channels may be performed dynamically, such as using periodic updates. For example, the channel management unit may periodically check availability of the channels, transmission rates of the channels, security of the channel, and other characteristics to determine which channels to use for transfer of certain data domains.

In some embodiments, a data domain may be parsed for transmission and used to generate multiple transmission packets from the same domain. These packets may be then sent using the same communication channel or multiple different communication channels. In general, the channel management unit may use information about the data domains, communication channels, and environment to form multiple transmission packets from the data domains and sending each transmission packet through its designated communication channel.

As noted above, multiple communication channels between an aircraft and a gate are formed using one electrical power cable. Each communication channel may be formed by two BPL modules coupled to the same conductor using either inductive or capacitive coupling. One of the BPL modules is positioned on the aircraft and may be referred to as an aircraft BPL module, while another BPL module is positioned at the gate and may be referred to as a gate BPL module. In some embodiments, a BPL modem may function as one or more BPL modules. For example, a single aircraft BPL modem may be capable of establishing multiple communication channels with gate BPL modules. In this example, the gate BPL modules may be also integrated into the same modem, but this integration is not necessary and separate BPL modules may be used at the gate. Various BPL protocols, such as IEEE1901/ITU-TG.hn, may be used for BPL communication channel.

Examples of Data Transfer Systems

FIG. 1 is a schematic illustration of a system 100 for terrestrial data transmission between an aircraft 110 and an external network 130 through gate 120, in accordance with some embodiments. While only one external network 130 is illustrated in this figure, one having ordinary skills in the art would understand that any number of external networks can be connected to gate 120 and exchange data with aircraft 110. Aircraft 110 is parked at gate 120 and connected to gate 120 using an electrical power cable 122. Aircraft 110 and, in some embodiments, gate 120, may be equipped with electrical power connectors for making these connections to electrical power cable 122. Electrical power cable 122 may be a standardized power cable suitable for different types of aircrafts, such as a stinger cable. The stinger cable is an insulated, flexible, all weather extension cord used to supply 3 phase, 400 Hz, 115 VAC electrical power. Electrical power cable 122 is capable of transmitting an electrical current of at least about 50 A in each phase. Electrical power cable 122 may be between about 10 feet and 500 feet long and nearly 2 inches in diameter. Additional details of electrical power cable 122 are described below with reference to FIG. 3A. In general, electrical power cable 122 includes two or more conductors. The electrical power to gate 120 may be supplied by external electrical power supply 150 that may include frequency converters, transformers, and other like electrical power equipment. It should be noted that data signals transmitted through electrical power cable 122 are not generally transmitted beyond external electrical power supply 150. In some embodiments, the data signals are not transmitted beyond gate 120. Furthermore, gate 120 and power supply 150 may be provided in the same location and may even be combined into the same physical unit.

Aircraft 110 may be equipped with a set of aircraft BPL modules 112 and an aircraft channel management unit 116. In some embodiments, multiple aircraft BPL modules 112 are coupled to the same aircraft channel management unit 116, which is in turn connected to one or more computer systems 115 of aircraft 110. Each of aircraft BPL modules 112 is connected to a separate conductor of electrical power cable 122 as further described below with reference to FIG. 2.

Gate 120 also includes multiple BPL modules 124, which may be referred to as gate BPL modules. For purposes of this disclosure, the gate is defined as a structure to which electrical power cable 122 is connected to. In some embodiments, a gate may include additional components disposed away from the parking location of aircraft 110. For example, gate 120 may include a solid state frequency converter, which may be positioned near the parking location of aircraft 110 or away from this location, such as inside the airport facility. Likewise, gate BPL modules 124 may be positioned near the parking location of aircraft 110 or away from this location. Gate BPL modules 124 may be connected to one or more external networks 130. In some embodiments, gate 120 may include various communication modules, such as an Ethernet module, a Wi-Fi module, and/or a cellular module for connecting to external networks 130.

Aircraft BPL modules 112 and gate BPL modules 124 are configured to establish multiple communication channels between aircraft 110 and gate 120. Specifically, a pair including one aircraft BPL module and one gate BPL module connected to the same conductor of electrical power cable 122 establishes a BPL communication link. Various transmission domains available on aircraft 110, gate 120, and/or external network 130 may be transmitted through these BPL communication channels while electrical power cable 122 is connected to both aircraft 110 and gate 120. Data transmission and power transmission may be performed at the same time using the same conductor. Data and power are transmitted using different frequency bands (e.g., 400 Hz for power and 2-80 MHz for data), which minimizes interference between these two transmissions. Furthermore, each BPL communication channel operates using its own frequency band that is different from frequency bands of any other channels.

The BPL communication channels may be configured to provide secure data transfer in comparison to other types of communication links that are currently available in the airport environment. Specifically, data signals transferred through the BPL communication channels are restricted to electrical power cable 122 and a few other electrical power components that operate at a certain frequency, for example, 400 Hz. All of these electrical power components are typically located within airport areas having restricted access. The data signals will be blocked by frequency converters, transformers, and other such electrical power components. The data signal is effectively contained within a small portion of the overall power system that is connected to an aircraft. Security within BPL communication channels may be further enhanced by encryption and other like technologies.

Furthermore, physical access to gate BPL module 124, electrical power cable 122, and any other components that may carry the data signal may be physically restricted. For example, secure enclosures that require successful authentication, via credentials, multi-factor crew authentication, digital keys, passcodes, RFID, biometrics, etc., to gain physical access to these modules and cables may be used. In some embodiments, gate BPL modules 124 and/or cable 122 may include GPS receivers for verifying that gate BPL modules 124 and/or cable 122 have not been moved from a pre-determined position. Furthermore, gate BPL modules 124 may be configured with a secure routing table that facilitates routing information via external network 130 using pre-determined hops and/or pre-determined destinations. Gate BPL modules 124 may be identified and/or addressed by a hardware identifier such as a MAC address. In some embodiments, gate BPL modules 124 may include various computer system components, such as output devices and ports (e.g., a display), input devices (e.g., a keyboard, touch screen, mouse), a memory (e.g., tangible computer readable memory). Furthermore, gate BPL modules 124 may include a channel management unit 126 for generating transmission packets and sending these transmission packets through established BPL communication channels.

Various servers may be a part of or connected to external network 130, such as airline servers, airport servers, aircraft service provider servers, aircraft manufacturer servers, and the like. These servers may be connected to external network 130 via a LAN, WAN, and/or the Internet. These servers may be configured to provide and receive data to and from aircraft 110. For example, the servers may provide software and/or firmware updates to components of aircraft 110, such as cabin systems software, flight bag, and avionics software. The servers may also provide content, such as music and movies, for in-flight entertainment systems on aircraft 110. External network 130 may also provide communication between aircraft 110.

BPL communication channels may be created by impressing a modulated carrier signal on a portion of the electrical power system extending between aircraft 110 and gate 130 and including electrical power cable 122. Gate BPL modules 124 and aircraft BPL modules 112 are used for impressing such signals on individual conductors of electrical power cable 122 when transmitting data. The same modules are also used for extracting data from these signals when receiving data. Different overall frequency bands may be used depending on the transmission distance and data rates requirements, such as between about 1 kHz and 500 MHz or, more specifically, between 2 MHz and 80 MHz. The overall frequency band is then divided into individual frequency bands for each BPL communication channel. Because the electric current used to power the aircraft and the electrical current used for data transmission use different frequencies, very little if any interference occurs between data and power transmissions. The data transfer rates may be at least about 15 Mbit per second or, more specifically, at least about 95 Mbit per second. In some embodiments, the data transfer rates are between about 30 Mbit per second and 500 Mbit per second.

BPL communication channels may follow one of the established or developing standards, such as IEEE 1901 or ITU-T's G.hn specification. For example, one or two of the following physical layers may be used in a protocol, e.g., a fast Fourier transform orthogonal frequency-division multiplexing modulation layer, and a wavelet orthogonal frequency-division multiplexing modulation layer. The first one of these layers may include a forward error correction scheme based on a convolutional turbo code. The second one of these layers may include a mandatory forward error correction based on a concatenated Reed-Solomon and convolutional code. On top of these two physical layers, one or more media access control (MAC) layers may be defined. For example, one MAC layer may be used for local networking, while another one may be used for access networking To manage coexistence of multiple physical layers and MAC layers, an inter-system protocol may be used. The protocol may be used so that various BPL devices, such as the gate BPL module and the aircraft BPL module, can share communication resources, such as frequency/time. A common electrical wiring is used for Orthogonal Frequency Division Multiplexed (OFDM) and Time Division Multiple Access (TDMA) modulation schemes.

Examples of Different Communication Links

Figure 2:
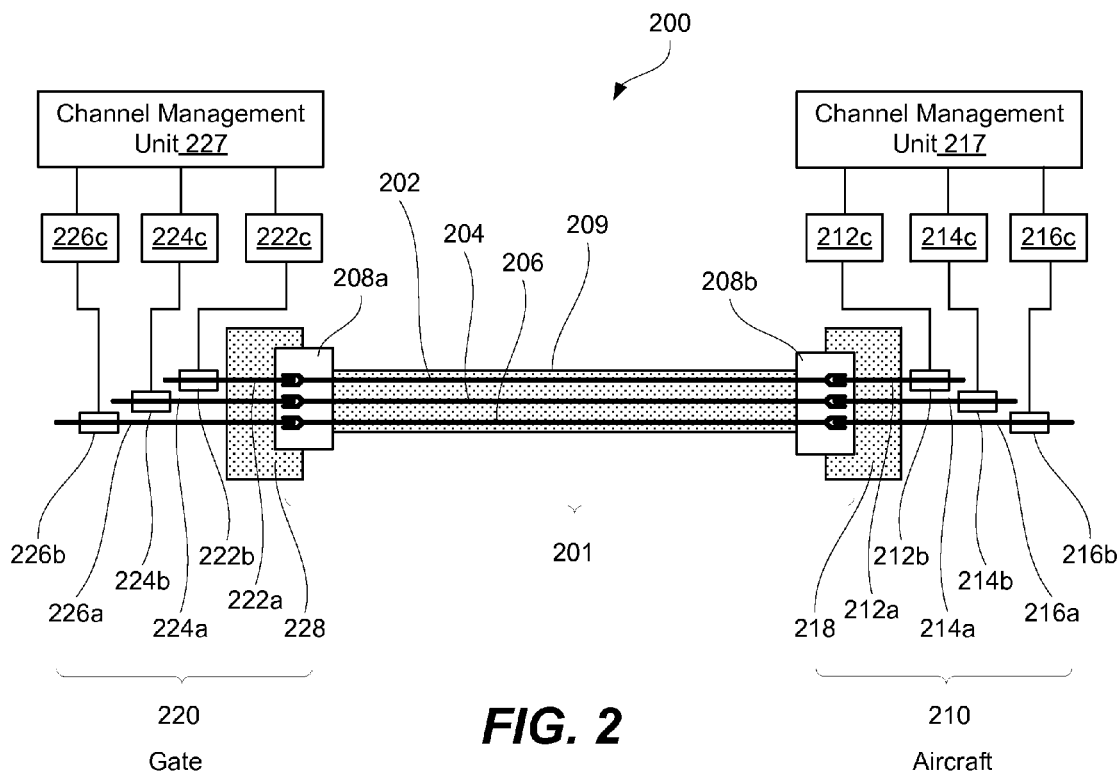
FIG. 2 is a schematic representation of different components of the system used to establish multiple BPL communication channels between the gate and the aircraft, in accordance with some embodiments.

FIG. 2 is a schematic representation of various components and connections within a communication system 200 responsible for establishing multiple BPL communication channels, in accordance with some embodiments. One having ordinary skills in the art would appreciate that communication system 200 can include other components (not shown in FIG. 2) or fewer components. For example, FIG. 2 illustrates three BPL communication channels established using three sets of conductors, gate BPL modules, and aircraft BPL modules. In some embodiments, only two BPL communication channels or more than three BPL communication channels may be used.

Communication system 200 shown in FIG. 2 includes electrical power cable 201 extending between and interconnecting aircraft 210 and gate 220. Electrical power cable 201 may include one or more connectors 208a and 208b for connecting to and disconnecting from respective connectors of aircraft 210 and gate 220. As shown in FIG. 2, cable connector 208a is connected to gate connector 228, while cable connector 208b is connected to aircraft connector 218. In some embodiments, electrical power cable 201 may be permanently attached to or integrated into gate 220.

Electrical power cable 201 includes multiple conductors, such as three conductors 202, 204, and 206 as shown in FIG. 2. Each of these conductors 202, 204, and 206 may be used for establishing a separate BPL communication channel between aircraft 210 and gate 220. The same conductors may be used for other purposes, such as to transmit electrical power from gate 220 to aircraft. In general, electrical power cable 201 may include two or more conductors. In the example shown in FIG. 3A and further described below, an electrical power cable includes six different conductors.

Each conductor of power cable 201 interconnects corresponding conductors of gate 220 and aircraft 210. Cable conductor 202 interconnects aircraft conductor 212a and gate conductor 222a, cable conductor 204 interconnects aircraft conductor 214a and gate conductor 224a, and cable conductor 206 interconnects aircraft conductor 216a and gate conductor 226a. Gate conductors 222a, 224a, and 226a may be connected to a power supply system (not shown) for supplying electrical power to aircraft 210. Each one of gate conductors 222a, 224a, and 226a is also connected to a separate gate BPL module for establishing a communication channel to aircraft 210. As shown in FIG. 2, gate conductor 222a is connected to gate BPL module 222c using gate coupler 222b, gate conductor 224a is connected to gate BPL module 224c using gate coupler 224b, and gate conductor 226a is connected to gate BPL module 226c using gate coupler 226b. Gate couplers 226a-226c may provide inductive or capacitive coupling between gate conductors 222a, 224a, and 226a and gate BPL modules 222c, 224c, and 226c.

A similar connection scheme between conductors and BPL modules may be used at aircraft 210. Aircraft conductors 212a, 214a, and 216a may be connected to various power systems of aircraft 210. These conductors 212a, 214a, and 216a may be used to supply power to these systems while aircraft 210 is parked at gate 220 and connected to gate 220 using electrical power cable 201. After the connection between aircraft 210 and cable 201 is made, each one of aircraft conductors 212a, 214a, and 216a is connected to a corresponding conductor of power cable 201. The connection between gate 220 and cable 201 further connects each one of aircraft conductors 212a, 214a, and 216a to a corresponding one of gate conductors 222a, 224a, and 226a. Aircraft conductors 212a, 214a, and 216a are inductive or capacitively coupled to aircraft BPL modules 212c, 214c, and 216c. As shown in FIG. 2, conductor 212a is connected to BPL module 212c using coupler 212b, conductor 214a is connected to BPL module 214c using coupler 214b, and conductor 216a is connected to BPL module 216c using coupler 216b.

A coupler for inductive coupling may include a ferrite core positioned around a corresponding conductor. Data transmission using this type of coupling may be performed without switching off the electrical power. In other words, the power transmission and the data transmission may be performed at the same time. The capacitive coupling involves a direct connection between a signal cable of BPL modem and a corresponding conductor. For safety reasons, the electrical power may be switched off when a communication channel established by capacitive coupling is in use. In some embodiments, one conductor is needed to establish one communication channel. Alternatively, two conductors may be needed in some embodiments to establish one communication channel.

Each pair of BPL modules, i.e., one gate BPL module and a corresponding aircraft BPL module, may be configured to operate at a different frequency band than any other pairs. For example, BPL modules 212c and 222c may be configured to operate at 2-28 MHz, BPL modules 214c and 224c may be configured to operate at 29-67 MHz, and BPL modules 216c and 226c may be configured to operate at 68-80 MHz. Other frequency bands may be used as well. Division into these bands depends on the overall frequency range available, regulations corresponding to various frequencies, number of conductors and BPL modules available for communication, data transmission requirements, and other like factors. Data transmission is performed through at least two different conductors using two different frequency bands that do not overlap with each other. In some embodiments, a portion of one frequency band may be below 30 MHz, while at least a portion of another frequency band is above 30 MHz. The division into different non-overlapping bands allows to avoid or at least to minimize RF interference in the electrical power line cable. This feature allows using an electrical power cable that does not have any RF shields around its conductors, such as a standard aircraft stinger cable, for two separate data transmissions at the same time. In some embodiments, frequency modulation is used to prevent or at least minimize the interference between RF signals in two adjacent conductors of the same electrical power cable. The frequency modulation may be used in addition or instead of frequency separation techniques described above.

Figure 3A:
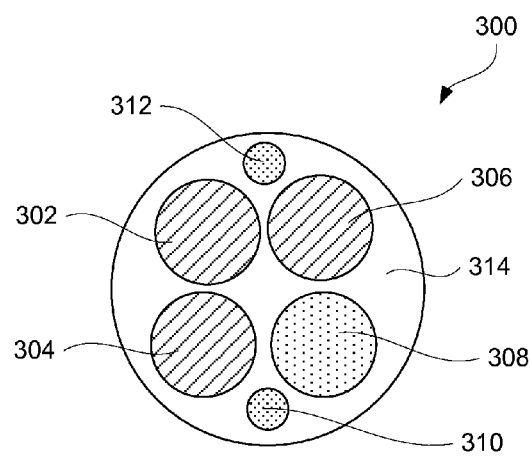
FIG. 3A is a schematic cross-sectional view of an electrical power cable, in accordance with some embodiments.

FIG. 3A is a schematic cross-sectional view of an electrical power cable 300, in accordance with some embodiments. Electrical power cable 300 includes six electrical conductors 302-312 and electrical insulation 314. As noted above, an electrical power cable may include two or more electrical conductors. Each of six conductors 302-312 may be used establish a separate BPL communication channel. The same conductors may have other uses. For example, three conductors 302-306 may be used for power transmission (one for each of three phases), one conductor 308 may be used for a ground connection, and two conductors 310 and 312 may be used by control circuitry to ensure that cable 300 is connected to corresponding aircraft and/or gate connectors. Each one of the conductors 302-306 may be configured to transmit an electrical current of at least about 50 Amps or, more specifically, of at least about 100 A. Conductors of an electrical power cable used to establish BPL communication links may not have RF insulation. RF interference is minimized by using different frequency bands. Furthermore, electrical power cables used in the airport environment are relatively short, such as between about 10 feet and 500 feet long, further reducing the risk of RF interference.

Returning to FIG. 2, aircraft BPL modules 212c, 214c, and 216c and BPL modules 222c, 224c, and 226c may be connected to their respective channel management units 217 and 227. The overall communication system may use two channel management units as shown in FIG. 2 or only one, either at the gate or aircraft. Channel management units 217 and 227 are used to generate transmission packs from data domains and send these transmission packs through established BPL communication channels. Channel management unit 217 is connected to one or more aircraft computer systems using, for example, bus connections, Ethernet connections, and other suitable connections. Likewise, channel management unit 227 is connected to one or more external networks (not shown in FIG. 2) using, for example, Wi-Fi connections, cellular connections, Ethernet connections, and other suitable connections. As such, gate 220 may include a gate Wi-Fi module, a gate cellular module, and/or a gate Ethernet module.

Figure 3B:
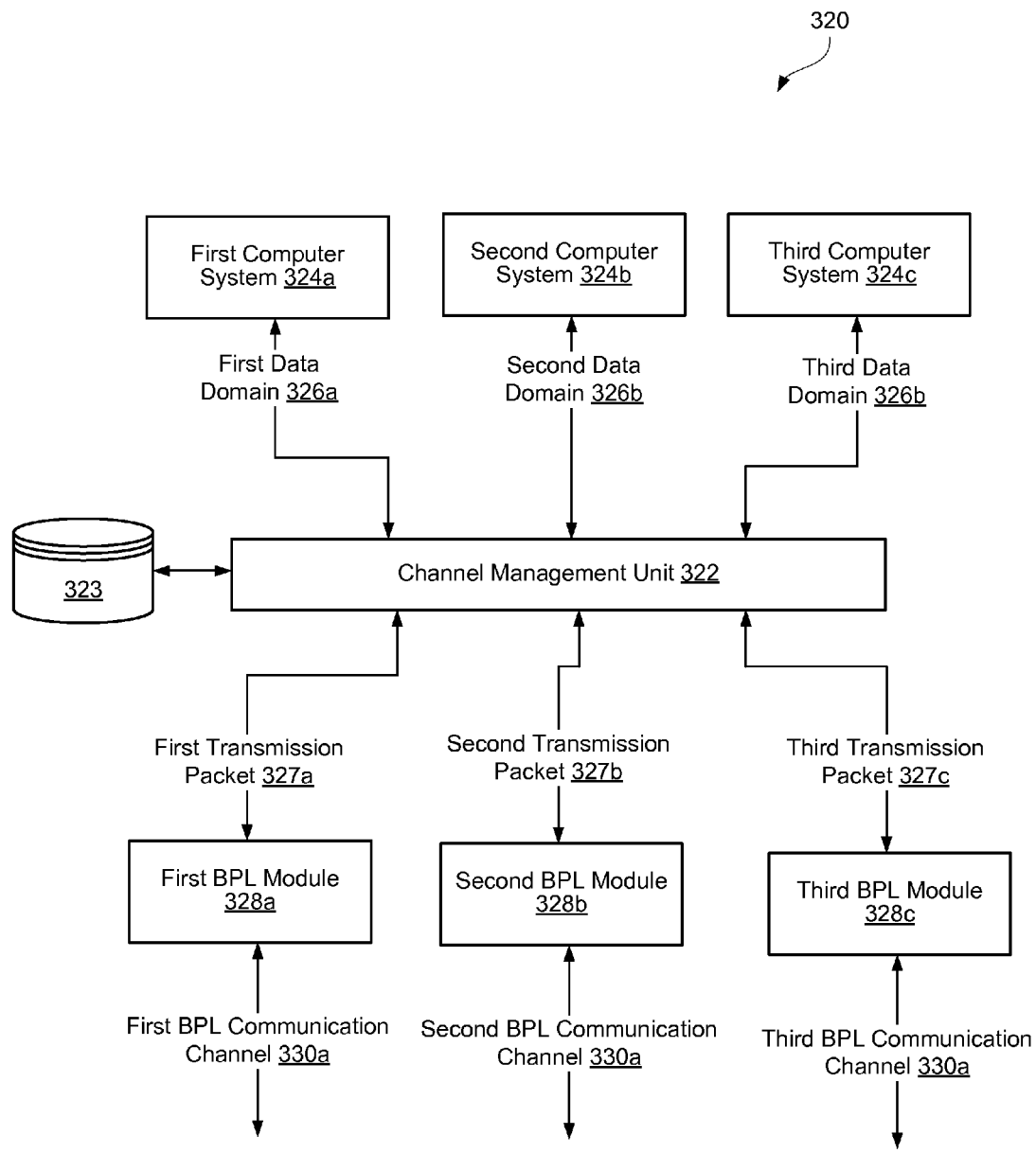
FIG. 3B is a flowchart illustrating various components of the communication system provided at the gate or on the aircraft and illustrating data flows among these components, in accordance with some embodiments.

FIG. 3B is a flowchart 320 illustrating various components of the communication system provided at the gate or on the aircraft and illustrating data flows among these components, in accordance with some embodiments. A channel management unit 322 is shown connected to three computer systems 324a-324b, each providing its own data domain for transmission to another side. Specifically, first computer system 324a may provide first data domain 326a, second computer system 324b may provide second data domain 326b, and third computer system 324c may provide third data domain 326c. In some embodiments, one computer system may provide multiple data domains. Some examples of different computer systems on the aircraft include a flight computer, central maintenance computer, digital flight data acquisition unit, and electronic flight bag. Some examples of data domains include aircraft control data (ACD), software parts, airline modifiable information (AMI), in-flight entertainment (IFE) including movies, audio programs, and video games, airplane information system (AIS) including weather information, notices to airmen (NOTAMs), approach plates, Jeppesen charts, and the like.

Computer systems 324a-324b may be connected to channel management unit 322 using bus connections, Ethernet connections, Wi-Fi connections, cellular connections, and other suitable connections. These connections may depend on location of channel management unit 322 (e.g., at the gate or on the aircraft, proximity to other systems), environment (e.g., availability of other connections), and integration with other components. In some embodiments, channel management unit 322 may be integrated into one or more of the computer systems and/or into one or more BPL modules. For example, a BPL modem may be configured to perform various functions of channel management unit 322.

In some embodiments, channel management unit 322 may be connected to a database 323 configured to store data domains and/or transmission packets. For example, if transmission speeds between computer systems 324a-324b and channel management unit 322 are slower than transmission speeds through BPL communication channel, then data domains may be pre-fetched from the computer systems to channel management unit 322 and stored in database 323 for future transmission through BPL communication channels. Pre-fetching may be also performed regardless of the speeds. For example, pre-fetched data domains may be analyzed by channel management unit to generate transmission packets.

Channel management unit 322 is also connected to multiple BPL modules. FIG. 3B illustrates channel management unit 322 connected to first BPL module 328a, second BPL module 328b, and third BPL module 328c. Each one of BPL modules 328a-328c is configured to establish a separate BPL communication channel with a corresponding BPL module on the other end of the communication system (not shown in FIG. 3B). Specifically, FIG. 3B illustrates first BPL module 328a establishing first BPL communication channel 330a, second BPL module 328b establishing second BPL communication channel 330b, and third BPL module 328c establishing third BPL communication channel 330c. The channel is used for sending and receiving transmission packets provided by one of the channel management units in the system.

Channel management unit 322 uses information about data domains, communication channels, and environment to generate transmission packets from data domains. For example, the data domains may include different amounts of data that needs to be transferred, may have different security status, may have different priority for data transfer, and other such factors. For example, the IFE data domain may have low transfer priority and low security but the amount of this data may be relatively large in comparison to other data domains. On the other hand, the ACD data domain may have high transfer priority and high security status. These factors may change dynamically as the aircraft continues to operate. For example, the ACD data domain may include landing information for a number of future flights of the aircraft. This information does not need to be updated after every single landing unless there are changes to future flights for this aircraft. The transfer priority for this landing information may be minimal after an initial flight, unless there are changes. However, the priority will increase with every new landing and the additional data transfer may eventually become critical. The channel management unit may consider this increase in priority to determine when to conduct the next transfer of the landing information.

The priority of sending data packets may be set before establishing BPL communication channels and even connecting the aircraft to the gate. For example, an aircraft channel management system may analyze events that occurred during flight to determine the priority for different data domains or corresponding transmission packets to be transferred from the aircraft to the gate and, in some embodiments, for data domains to be transferred from the gate to the aircraft. If no special events occurred during the flight, then a standard (e.g., low) priority may be assigned to the data domains including, for example, flight logs. This standard priority may be lower than, for example, priority assigned to other types of data domains, such as data domains containing information about upcoming flights and even IFE data domains. However, if special events occurred during the flight, then the data domains or transmission packets including flight logs may have a relatively high priority. For example, certain weather conductions and/or mechanical operations that the aircraft has experienced during the flight may cause the priority to increase. One specific example is triggering a master caution warning or just a general warning during the flight, which may result in the highest priority assigned to the flight log data domains. In this case, the data domains or, more specifically, corresponding transmission packets may be transferred first, for example, as soon as the first BPL communication channel is established. On the other hand, advisory messages generated during the flight may or may not cause any changed to the priority. In some embodiments, advisory messages increase the priority level above the standard level. Furthermore, status messages may not cause the increase in priority.

Likewise, a gate channel management unit may prioritize its data domains before being connected to the aircraft. This prioritization process may be performed based, for example, on the information currently available on the aircraft, future needs for the information on the aircraft (e.g., future flight plans, changes to previously established flight plans), data available to the gate, and available time for transfer, and other like factors. In some embodiments, the overall process involves comparing predetermined priorities of the aircraft with the predetermined priorities for the gate to collectively set the overall priority for sending transmission packets. This overall priority may or may not depend on the number of BPL communication channels, connection time to the gate, availability of other communication means, and other factor. In some embodiments, the priorities are changed dynamically after sending initial transmission packets.

Examples of Data Transfer Methods

Figure 4A:
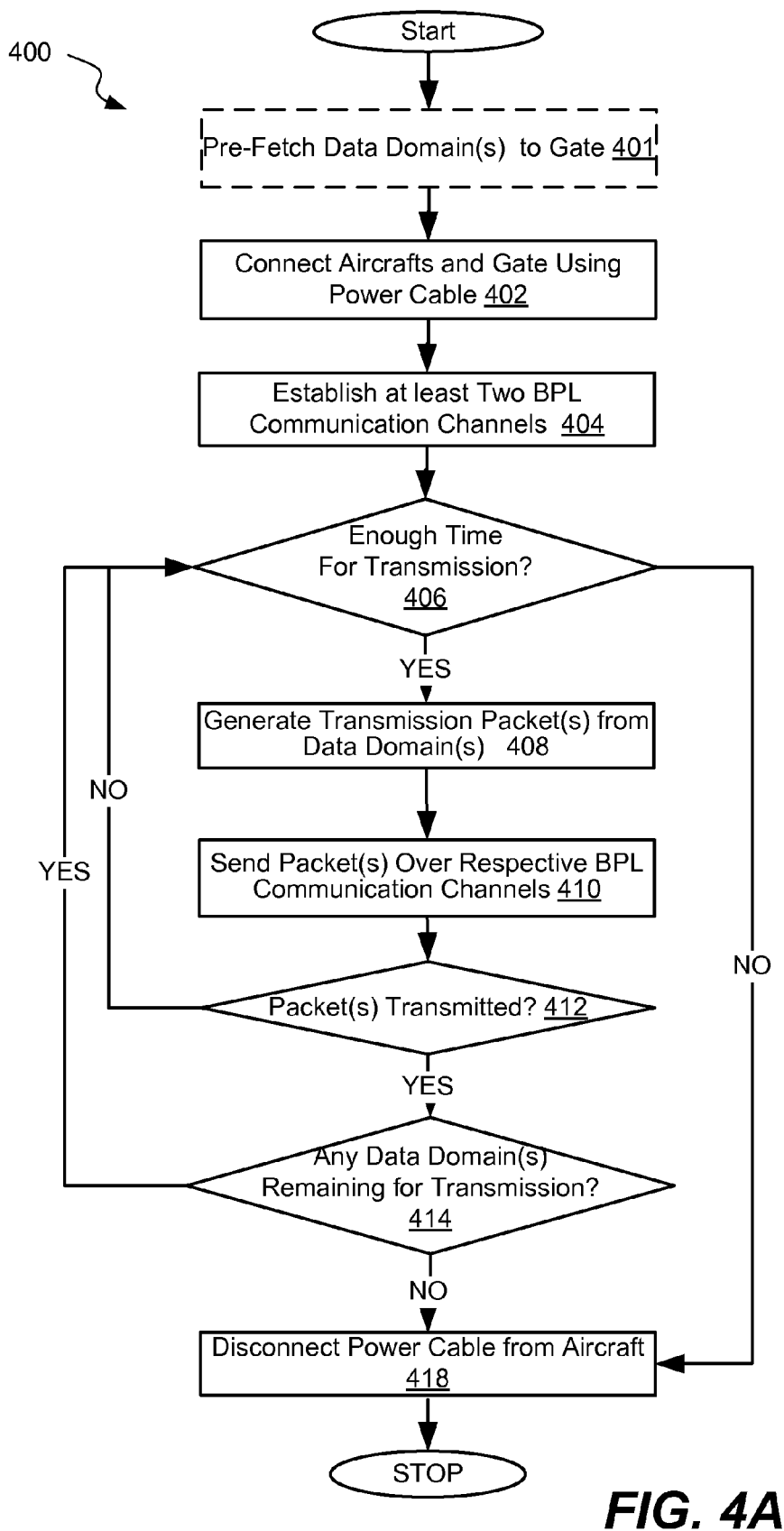
FIG. 4A is a process flowchart corresponding to a method for terrestrial data transmission between an aircraft and an external network using an electrical power cable connecting the aircraft to the gate, in accordance with some embodiments.

FIG. 4A is a process flowchart corresponding to a method 400 for data transmission between an aircraft and an external network, in accordance with some embodiments. Various examples of aircrafts and gates are described above with reference to FIGS. 1-3. The aircraft includes multiple aircraft BPL modules, each connected to a separate aircraft conductor. Likewise, the gate includes multiple gate BPL modules, each connected to a separate gate conductor. The aircraft and/or the gate may be equipped with a channel management unit(s) for generating transmission packets from data domains. The aircraft may be parked at the gate allowing an electrical power cable to interconnect the aircraft and the gate.

In some embodiments, method 400 may start with prefetching one or more data domains to the gate during optional operation 401. For example, an aircraft may be parked at the gate for a relatively short period of time, while the transfer speeds between the gate and external networks may not be sufficiently fast for receiving all data domains from the networks during this short period of time. Instead of waiting until the aircraft is actually connected to the gate by the electrical power cable and communication channels are established to start transferring data, the data transfer to the gate may start before the aircraft is connected to the gate. In fact, the gate may include all data domains that need to be transferred to the aircraft prior to making the connection to the electrical power cable. Furthermore, the gate may include data domains for multiple aircrafts and its channel management unit or another device may control transfer of these domains to correct aircraft. In fact, certain data domains, such as IFE data domains, may be shared among multiple aircraft. In some embodiments, data domains may be continuously prefetched to gates as data domains become available for transfer or within a certain predetermined period of time prior to the transfer to aircraft.

Method 400 may proceed with connecting the aircraft to the gate using the electrical power cable during operation 402. More specifically, a cable connector is connected to the aircraft connector. If the cable was not previously connected to the gate, then another cable connector is connected to a gate connector. In some embodiments, one end of the electrical power cable is integrated into the gate and this second connection is not necessary. After this operation, individual electrical connections are provided between cable conductors and aircraft conductors. Furthermore, the aircraft conductors are now electrically interconnected with gate conductors. The gate BPL modules are ready to establish multiple communication channels with the aircraft BPL modules. Furthermore, the aircraft is also ready to receive electrical power from the gate through the power cable. In some embodiments, the electrical power may be transmitted before data transmission, during data transmission (using the same and/or different conductors), and/or after data transmission.

Method 400 may proceed with establishing at least two BPL communication channels during operation 404. Different conductors of the electrical power cable are used for establishing these BPL communication channels. Different non-overlapping frequency bands may be used for each BPL communication channel as noted above. Overall, the first BPL communication channel may be established using the first conductor and may use a first frequency band, while the second BPL communication channel may be established through the second conductor and may use a second frequency band.

Method 400 may proceed with checking time availability for transmission as noted by decision block 406. Transmission speeds of BPL channels as well as sizes of data domains may be considered during this operation. In some embodiments, transmission speeds of aircraft networks, e.g., between aircraft BPL modules and aircraft computer systems, and transmission speeds between the gate and external networks may be considered. In some embodiments, data domains may be broken into smaller domains to ensure transmission. Furthermore, BPL channels may be reestablished.

Method 400 may proceed with generating transmission packets from data domains during operation 408. Each transmission packet may be designated for a particular BPL communication channel. As noted above, information about the established BPL communication channels, information about the data domains, and/or information about the transmission environment may be used for generating the transmission packets. In some embodiments, a first set of transmission packets is generated as soon as BPL communication channels are established. Alternatively, transmission packets may be generated earlier, for example, from prefetched data domains in anticipation of BPL communication channels being established. A channel management unit may generate transmission packets. For example, an aircraft channel management unit may generate transmission packets from the data domains available on the aircraft for transmission from the aircraft to the gate. Likewise, a gate channel management unit may generate transmission packets from the data domains available at the gate for transmission from the gate to the aircraft.

Method 400 may then proceed with sending transmission packets using multiple BPL communication channels during operation 410. In some embodiments, two different transmission packets may be transmitted at the same time using different BPL communication channels. Both packets may be transmitted in the same direction, e.g., from the aircraft to the gate or, vice versa, from the gate to the aircraft using two or more BPL communication channels. In some embodiments, one packet may be transmitted from the gate to the aircraft using one BPL communication channel, while another packet may be transmitted from the aircraft to the gate at the same time using another BPL communication channel.

Figure 4B:
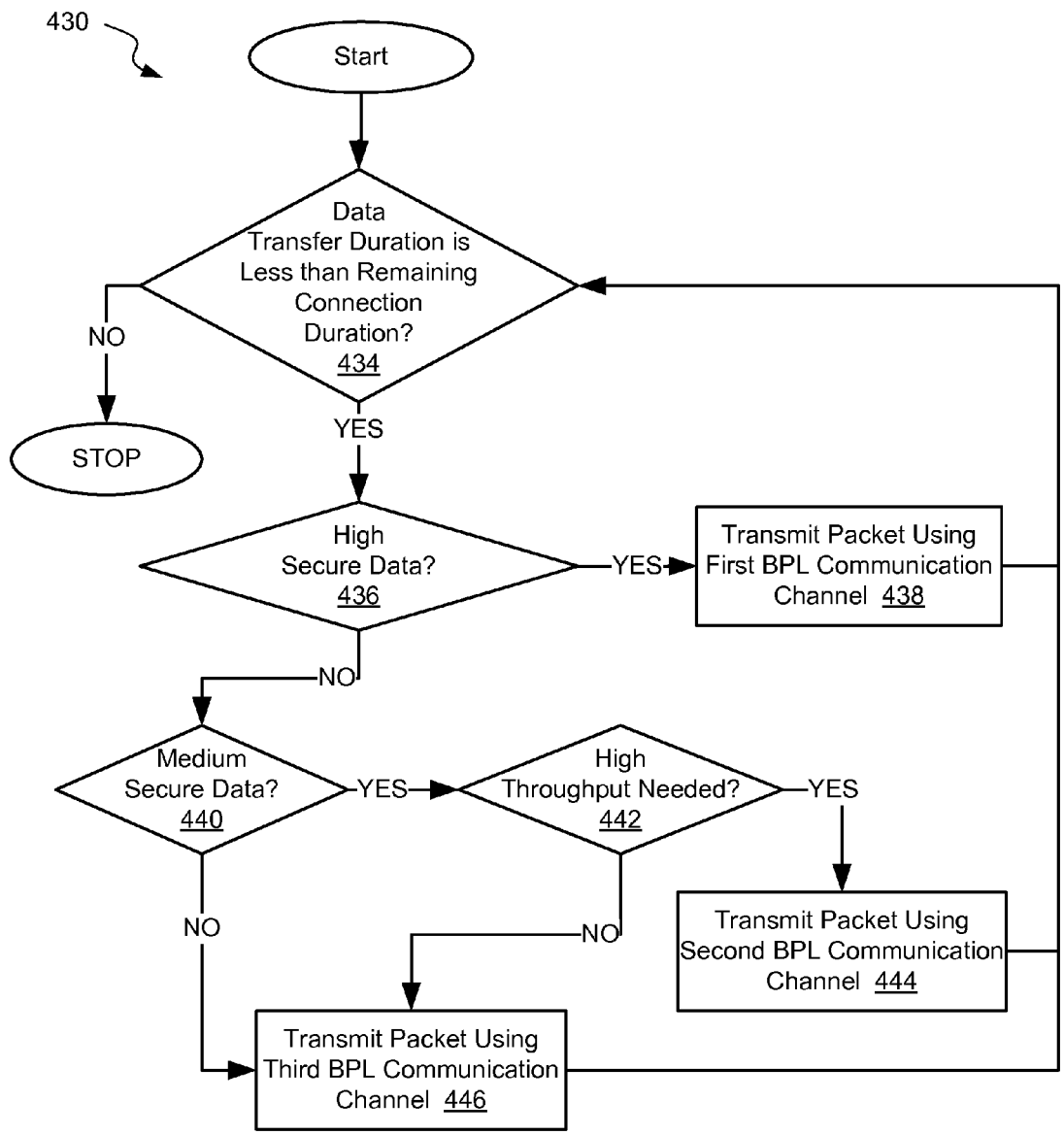
FIG. 4B is a process flowchart illustrating an example of generating transmission packets and sending these transmission packets over different BPL communication channels, in accordance with some embodiments.

One example of generating and sending transmission packets is presented in FIG. 4B. When a data domain is provided to the channel management unit, the channel management unit may proceed with determining if expected data transfer duration is less than the remaining connection duration time as reflected by decision block 430. Specifically, the channel management unit may analyze the data transfer rates of available BPL communication channels and the size of the data domains to determine the expected transfer duration. The process may be aborted if there is not enough time for transfer. Alternatively, the data domain may be partitioned into subdomains that can be transferred during the remaining time and only a portion of the data domain is then transferred. The remaining portion of the subdomain may be saved for the future transfer. In some embodiments, any data domains or portions thereof that have not been transferred are redirected to the next gate at the next airport to which the aircraft is scheduled to land next.

If the channel management unit determines that there is sufficient time to transfer a data domain or a portion thereof, then the process may proceed with determining security status of this data domain as reflected by decision block 436 and 440. In this example, the high security data is transmitted using the first BPL communication channel as shown by block 438. For example, a first transmission packet may be generated from the data domain and then this first transmission packet is sent through the first BPL communication channel. In some embodiments, the first transmission packet includes only a portion of the data domain. Furthermore, the first transmission packet may include at least a portion of another data domain. In some embodiments, a channel may be designated only for transferring data having a particular security level and may not be used for transferring any other kinds of data, even when the channel is available. Alternatively, BPL communication channels may be selected by the channel management unit for sending any transmission packets based on channels' availability.

If the data domain is deemed to have the medium security as reflected by decision block 440, then the process may continue with determining whether a high throughput for this data domain is needed as reflected by decision block 442. The information about data transmission speeds for each communication channel and the remaining connection time may be the system to decide which data domains to send during the remaining time. If the high throughput is needed, then the data domain is transmitted using the second BPL communication channel or a communication channel having the higher throughput capabilities. More specifically, a second transmission pack is generated from the data domain, and this second transmission pack is then sent using the second BPL communication channel. Alternatively, if the high throughput is not needed or if the data does not have the medium security status, then the data domain is transmitted using the third BPL communication channel. In this case, a third transmission pack is generated from the data domain, and this third transmission pack is then sent using the third BPL communication channel.

Returning to FIG. 4A, method 400 may involve transmission verification as reflected by block 412. If one or more packets were not transmitted, then method 400 may proceed with attempting to retransmit the same packets or repack the data in these packets into new packets as shown by the loop back to block 406-410. For example, an initially established BPL communication channel may be become unavailable during transmission and the packet sent using this channel may not reach its destination. In this case, the channel management unit becomes informed of this failure and may attempt to retransmit this package over the same BPL communication channel when it becomes available or repack the data into one or more new packages and attempt to transmit these new packages over one or more other BPL communication channels.

Furthermore, method 400 may involve identifying any remaining data domains for transfer as reflected by block 414. If there are any remain domains, operations 406-412 are repeated. Assuming there is still enough time for transmission of additional packets, the channel management unit may generate one or more additional transmission packets from the remaining data domains and use the one or more BPL channels to send these new packets.

In some embodiments, operations 406-414 are performed individually for each BPL communication channel. In other words, the BPL communication channels are managed individually by the channel management unit. In doing so, the channel management unit considers all data domains ready for transmission and various factors as described above. At some point during execution of method 400, the electrical power cable may be disconnected from the aircraft as reflected by operation 418 in FIG. 4.

Examples of Aircrafts

Figure 5:
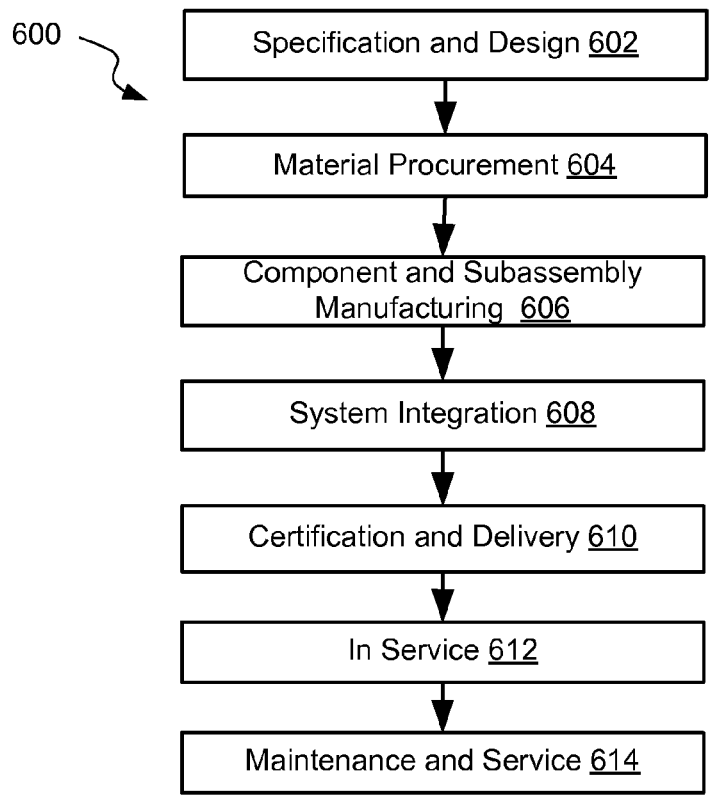
FIG. 5 is a process flowchart illustrating key operations of aircraft manufacturing and service, in accordance with some embodiments.

An aircraft manufacturing and service method 600 shown in FIG. 5 and an aircraft 630 shown in FIG. 6 will now be described to better illustrate various features of methods and systems presented herein. During pre-production, aircraft manufacturing and service method 600 may include developing specification and design 602 of aircraft 630 and performing material procurement 604. Integration of BPL communication modules and a channel management unit into aircraft may be considered during these operations. Furthermore, connections of BPL communication modules to conductors of the aircraft power connector are considered. The production phase involves fabricating component and subassembly manufacturing 606 and system integration 608 of aircraft 630. Thereafter, aircraft 630 may go through certification and delivery 610 in order to be placed in service 612. While in service by a customer, aircraft 630 is scheduled for routine maintenance and service 614, which may also include modification, reconfiguration, refurbishment, and other like operations. While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 6:
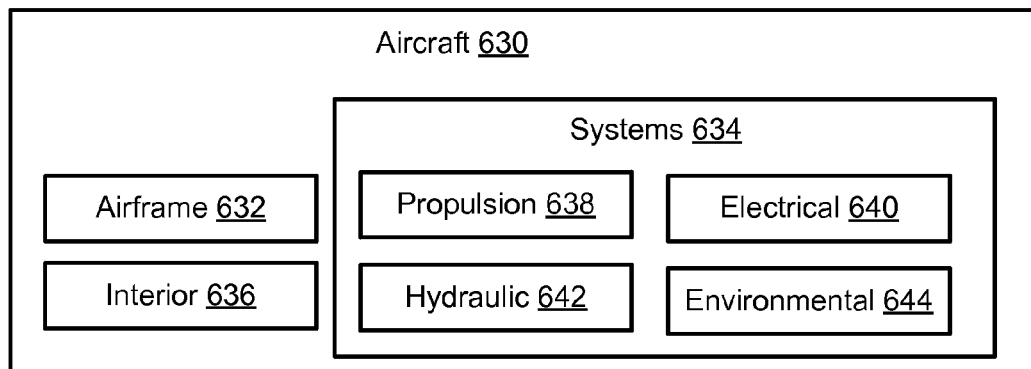
FIG. 6 is a block diagram illustrating various components of an aircraft, in accordance with some embodiments.

As shown in FIG. 6, aircraft 630 produced by aircraft manufacturing and service method 600 may include airframe 632, interior 636, and multiple systems 634 and interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Systems and methods embodied herein may be employed during any one or more of the stages of aircraft manufacturing and service method 600. For example, components or subassemblies may be fabricated or manufactured in a manner similar to components or subassemblies produced while aircraft 630 is in service. Furthermore, the methods and systems may be utilized during component and subassembly manufacturing 606 and system integration 608, for example, for expediting assembly of or reducing the cost of aircraft 630. Similarly, the methods and systems may be utilized while aircraft 630 is in service, for example, for maintenance and service 614.

Examples of Computer Systems

Figure 7:
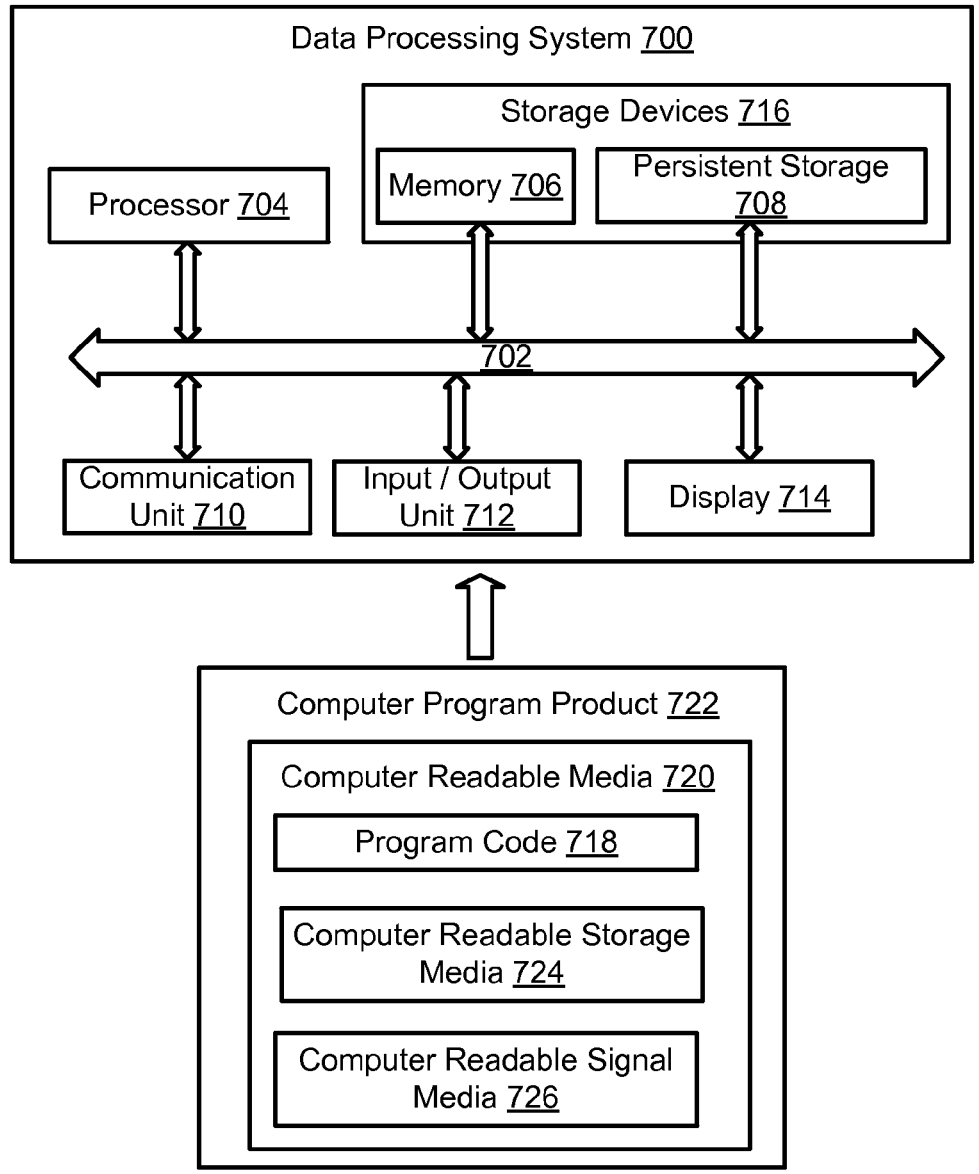
FIG. 7 is a block diagram illustrating a data processing system used for terrestrial data transmission between an aircraft and an external network, in accordance with some embodiments.

Turning now to FIG. 7, an illustration of a data processing system 700 is depicted in accordance with some embodiments. Data processing system 700 may be used to implement one or more computers used in a controller or other components of various systems described above, such as channel management units, BPL communication modules, aircraft computer systems, gate computer systems, computer systems of external networks, and the like. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, for example without limitation, data, program code in functional form, and/or other suitable information either on a temporary basis and/or a permanent basis. Storage devices 716 may also be referred to as computer readable storage devices in these illustrative examples. Memory 706 may be a random access memory or any other suitable volatile or non-volatile storage device. Persistent storage 708 may take various forms, depending on the particular implementation. For example, persistent storage 708 may contain one or more components or devices, such a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method for terrestrial data transmission between aircrafts and external networks, the method comprising:
    establishing a first broadband over power line (BPL) communication channel and a second BPL communication channel through an electrical power cable connected to an aircraft and a gate,
        the power cable comprising a first conductor and a second conductor,
        the first BPL communication channel established through the first conductor,
        the second BPL communication channel established through the second conductor;
    generating a first transmission packet from a first data domain and a second transmission packet from a second data domain using a channel management unit;
    sending the first transmission packet for transmission through the first BPL communication channel; and
    sending the second transmission packet for transmission through the second BPL communication channel.

2. The method of claim 1, wherein transmission of the first transmission packet and the second transmission packet is performed at least one of at the same time.

3. The method of claim 1, wherein transmission of the first transmission packet is performed independently from transmission of the second transmission packet.

4. The method of claim 1, wherein the channel management unit generates the first transmission packet and the second transmission packet based on one or more factors selected from the group consisting of:
  duration of the power cable connection,
  security status of each of the first data domain and the second data domain,
  security of each of the first BPL communication channel and the second BPL communication channel,
  transmission priority of each of the first data domain and the second data domain,
  transmission rate of each of the first BPL communication channel and the second BPL communication channel, and
  data amount in each of the first data domain and the second data domain.

5. The method of claim 1, wherein the first data domain and the second data domain comprise one or more data types selected from the group consisting of aircraft control data, in-flight entertainment, and airplane information system.

6. The method of claim 1, further comprising prefetching at least one of the first data domain and the second data domain.

7. The method of claim 1, further comprising using a first frequency band for the first BPL communication channel and using a second frequency band for the second BPL communication channel, the second frequency band not overlapping with the first frequency band.

8. The method of claim 1, wherein the first transmission packet is generated at least in part from the second data domain.

9. The method of claim 1, further comprising generating one or more additional transmission packets for transmitting over the first BPL communication channel.

10. The method of claim 1, wherein at least a portion of the first frequency band is below 30 MHz, and wherein at least a portion of the second frequency band is above 30 MHz.

11. The method of claim 1, further comprising:
  establishing a third BPL communication channel through a third conductor of the electrical power cable and using a third frequency band not overlapping with the first frequency band and the second frequency band;
  generating a third transmission packet from a third data domain using the channel management unit; and
  sending the third transmission packet through the third BPL communication channel.

12. The method of claim 11, wherein at least a portion of the first frequency band is below 30 Mhz, wherein at least a portion of the second frequency band is between 30 Mhz and 67 Mhz, and wherein at least a portion of the third frequency band is above 67 Mhz.

13. The method of claim 1, wherein each of the first conductor and the second conductor is configured to transmit an electrical current of at least about 50 A.

14. The method of claim 1, wherein the electrical power cable does not include a radio frequency (RF) shielding around the first conductor or the second conductor.

15. The method of claim 1, wherein the electrical power cable is between about 10 feet and 500 feet long.

16. The method of claim 1, further comprising transmitting electrical power at about 110V and about 400 Hz using the first conductor while sending the first transmission packet through the first BPL communication channel.

17. A system for terrestrial data transmission between aircrafts and external networks, the system comprising:
  an electrical power connector for connecting to an electrical power cable,
    the electrical power connector comprising a first conductor and a second conductor;
  a first BPL module coupled to the first conductor and configured to establish a first BPL communication channel;
  a second BPL module coupled to the second conductor and configured to establish a second BPL communication channel; and
  a channel management unit coupled to the first BPL module and to the second BPL module,
    the channel management unit configured to generate a first transmission packet from a first data domain and a second transmission packet from a second data domain and to send the first transmission packet through the first BPL communication channel and the second transmission packet through the second BPL communication channel.

18. The system of claim 17, further comprising a first computer system configured to store the first data domain and a second computer system configured to store the second data domain, the first computer system and the second computer system communicatively coupled to the channel management system.

19. The system of claim 17, wherein the first data domain and the second data domain comprises one or more data types selected from the group consisting of aircraft control data, in-flight entertainment, and airplane information system.

* * * * *